United States Patent
Karlsen et al.

(10) Patent No.: US 10,374,378 B2
(45) Date of Patent: Aug. 6, 2019

(54) LIGHT TRAP FOR HIGH POWER FIBER LASER CONNECTOR

(71) Applicant: NLIGHT, Inc., Vancouver, WA (US)

(72) Inventors: Scott R. Karlsen, Battle Ground, WA (US); Walter R. Sanders, Vancouver, WA (US)

(73) Assignee: NLIGHT, INC., Vancouver, WA (US)

( * ) Notice: Subject to any disclaimer, the term of this patent is extended or adjusted under 35 U.S.C. 154(b) by 0 days.

(21) Appl. No.: 16/158,135

(22) Filed: Oct. 11, 2018

(65) Prior Publication Data

US 2019/0123505 A1 Apr. 25, 2019

Related U.S. Application Data

(63) Continuation of application No. 15/596,924, filed on May 16, 2017, now Pat. No. 10,141,707.

(60) Provisional application No. 62/336,871, filed on May 16, 2016.

(51) Int. Cl.
| | |
|---|---|
| *H01S 3/067* | (2006.01) |
| *H01S 3/06* | (2006.01) |
| *G02B 6/24* | (2006.01) |
| *H01S 3/0941* | (2006.01) |
| *H01S 3/04* | (2006.01) |

(52) U.S. Cl.
CPC ............ *H01S 3/06704* (2013.01); *G02B 6/24* (2013.01); *H01S 3/0621* (2013.01); *H01S 3/0407* (2013.01); *H01S 3/0941* (2013.01)

(58) Field of Classification Search
CPC ...... G02B 6/24; H01S 3/06704; H01S 3/0621
See application file for complete search history.

(56) References Cited

U.S. PATENT DOCUMENTS

| | | |
|---|---|---|
| 5,121,251 A | 6/1992 | Edwards |
| 5,859,944 A | 1/1999 | Inoue et al. |
| 6,167,177 A | 12/2000 | Sandström et al. |
| 7,379,648 B1 | 5/2008 | Brooks et al. |
| 8,189,278 B2 | 5/2012 | Roos et al. |
| 8,724,945 B2 | 5/2014 | Gapontsev et al. |
| 8,878,095 B2 | 11/2014 | Li et al. |
| 9,052,467 B2 | 6/2015 | Roos et al. |
| 2006/0076239 A1 | 4/2006 | Inaba et al. |
| 2007/0172174 A1 | 7/2007 | Scerbak et al. |
| 2010/0175454 A1 | 7/2010 | Eigler et al. |
| 2011/0158721 A1 | 6/2011 | Matsubara et al. |

(Continued)

FOREIGN PATENT DOCUMENTS

| | | |
|---|---|---|
| CN | 203773093 U | 8/2014 |
| WO | 2015057125 A1 | 4/2015 |

OTHER PUBLICATIONS

Johnson, Tim; "OPTI 521 Optomechanical Enginerring Report 2"; Unversity of Arizona; Dec. 11, 2007; retrieved online: https://www.google.com/search?q=OPTI+521+OPtoechanical+engineering+Tim+Johnson&oq=OPTI+521+OPtoechanical+engineering+Tim+Johnson&aqs=chrome..69i57.15448j1j7&sourceid=chrome&ie=UTF-8#.

(Continued)

*Primary Examiner* — Chris H Chu
(74) *Attorney, Agent, or Firm* — Schwabe Williamson & Wyatt, P.C.

(57) ABSTRACT

A fiber laser system includes a fiber laser connector having a housing to terminate a fiber that generates a laser beam. A chamber extends internally along a length of the housing. A light trap includes a plurality of threads formed along a wall of the chamber to trap light reflected back to the fiber laser connector in response to an application of the laser beam to a workpiece.

20 Claims, 7 Drawing Sheets

(56) References Cited

U.S. PATENT DOCUMENTS

| | | |
|---|---|---|
| 2012/0288230 A1 | 11/2012 | Pologe et al. |
| 2012/0289798 A1 | 11/2012 | Pologe et al. |
| 2013/0011102 A1 | 1/2013 | Rinzler et al. |
| 2014/0107630 A1 | 4/2014 | Yeik et al. |
| 2014/0211818 A1 | 7/2014 | Hou et al. |
| 2015/0249311 A1 | 9/2015 | Rowen et al. |
| 2015/0277077 A1 | 10/2015 | McIntyre et al. |
| 2016/0054099 A1 | 2/2016 | Christiansen et al. |
| 2017/0007107 A1 | 1/2017 | Scheller et al. |

OTHER PUBLICATIONS

US Patent and Trademark Office (ISA); International Search Report and Written Opinion PCT/US2017/032935; dated Jul. 21, 2017; 7 pages.

European Patent Offifce, European Search Report in European Patent Application No. 17800026.1, dated May 7, 2019, 4 pages.

Figure 3A:
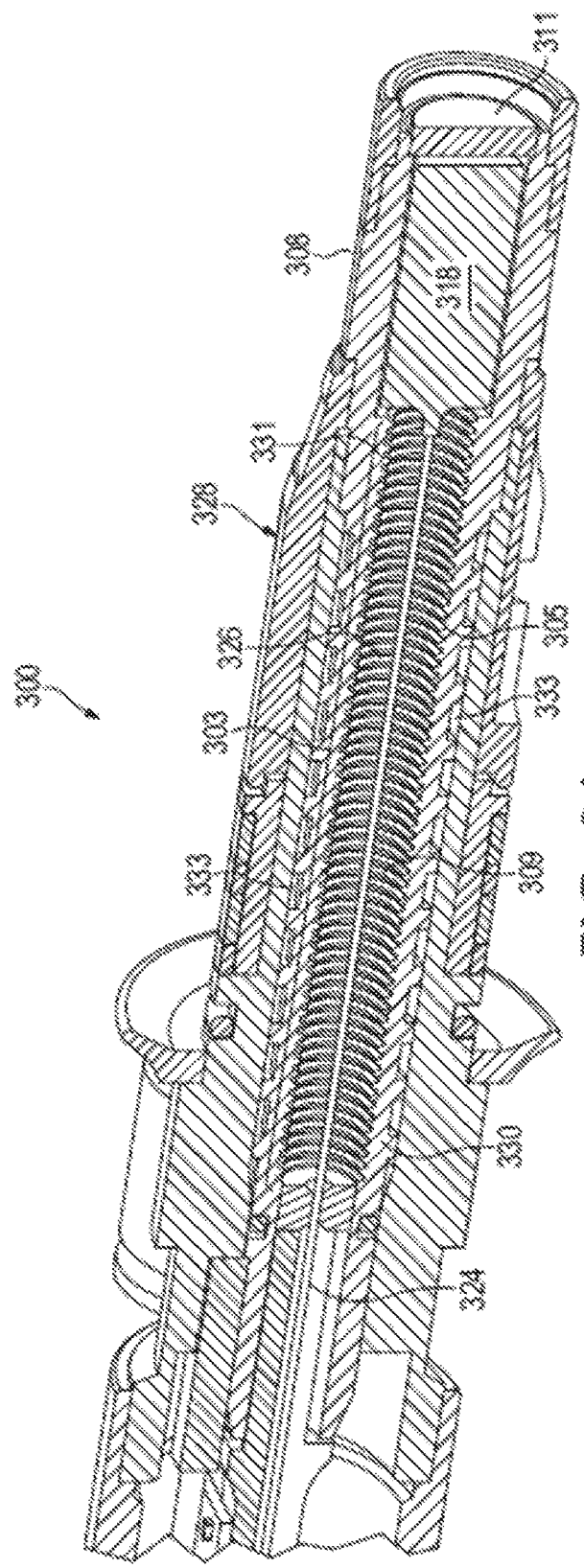

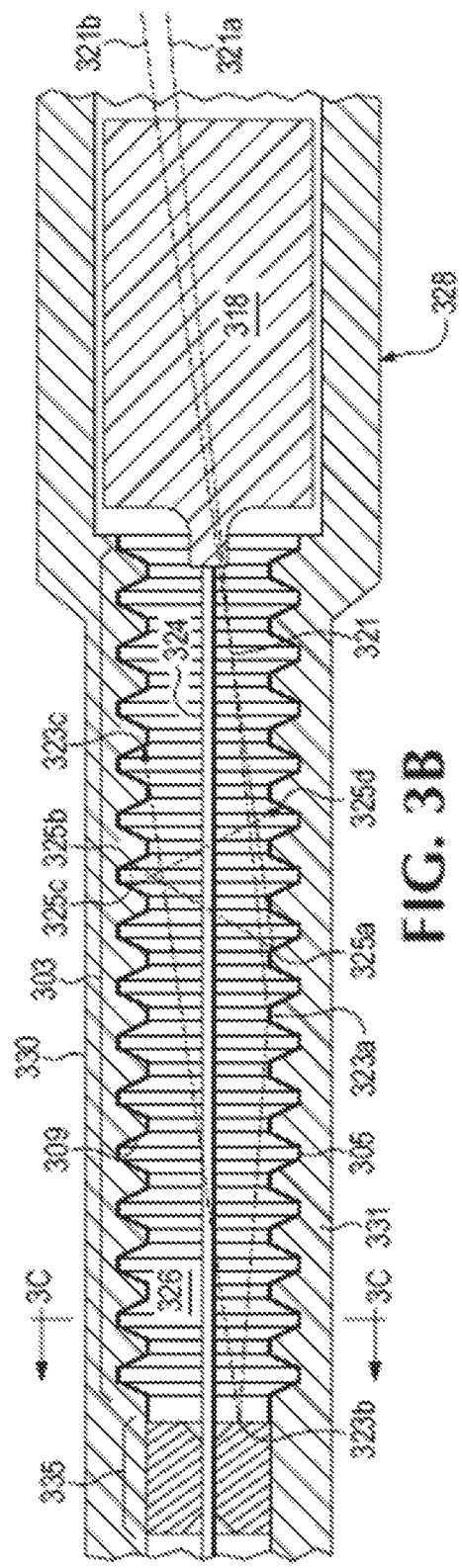
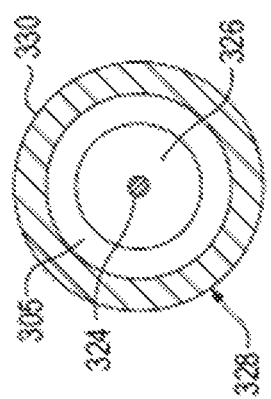
FIG. 3B
FIG. 3C

LIGHT TRAP FOR HIGH POWER FIBER LASER CONNECTOR

RELATED APPLICATIONS

This application is a continuation of U.S. patent application Ser. No. 15/596,924, filed on May 16, 2017, which claims priority benefit to U.S. Provisional Application No. 62/336,871, filed on May 16, 2016, each of which is herein incorporated by reference in its entirety for all purposes.

TECHNICAL FIELD

The present disclosure relates to a light trap for a high power fiber laser connector.

BACKGROUND

Fiber lasers are a type of optical laser system that includes a clad fiber rather than a rod, a slab, or a disk. Fiber lasers reflect light through an optical cavity such that a stream of photons stimulates atoms in a fiber that store and release light energy at useful wavelengths. Fiber type, core size, numerical aperture, refractive index, and doping of the fiber contribute to the range and possibilities of light propagation using fiber laser systems. Fiber laser systems are used in many industrial, defense, and scientific applications for different purposes, including, telecommunications, spectroscopy, medicine, directed energy weapons, and cutting, marking, engraving, and etching various workpieces. Fiber laser systems have limitations, including failure modes tied to light reflected back to the fiber from the workpieces on which the fiber laser systems operate. Removal of back-reflected light can be problematic if measures are not taken to remove the unwanted light in such a way as to prevent concentrating the light into hot spots that can damage the optical laser system.

BRIEF DRAWINGS DESCRIPTION

Figure 1A:
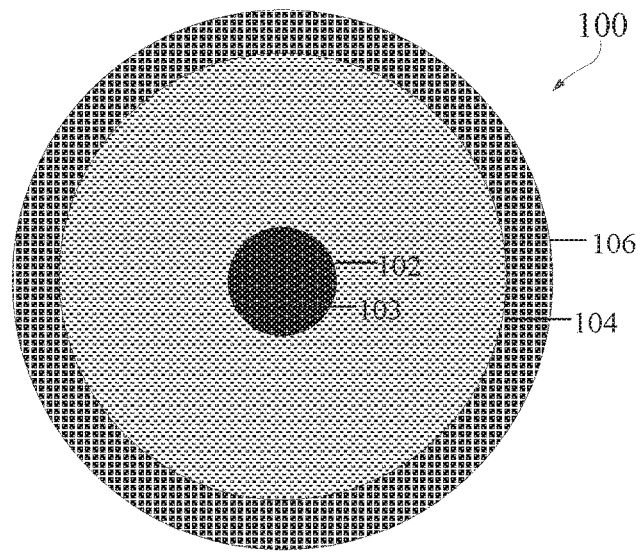
Figure 1B:
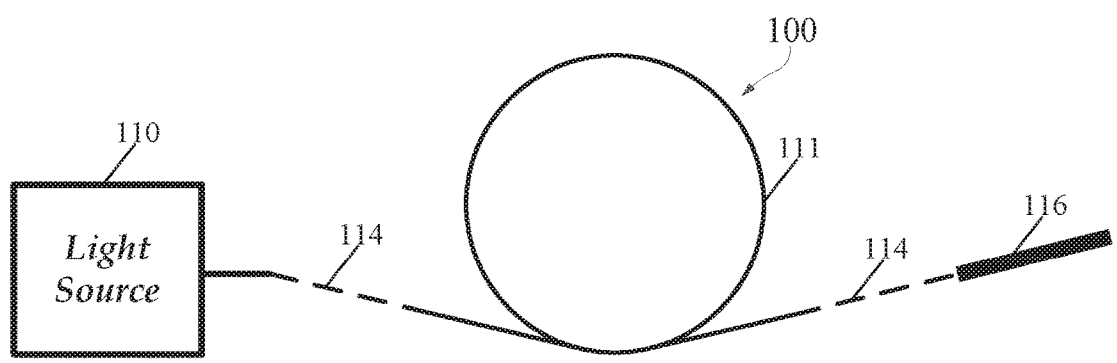
Figure 2:
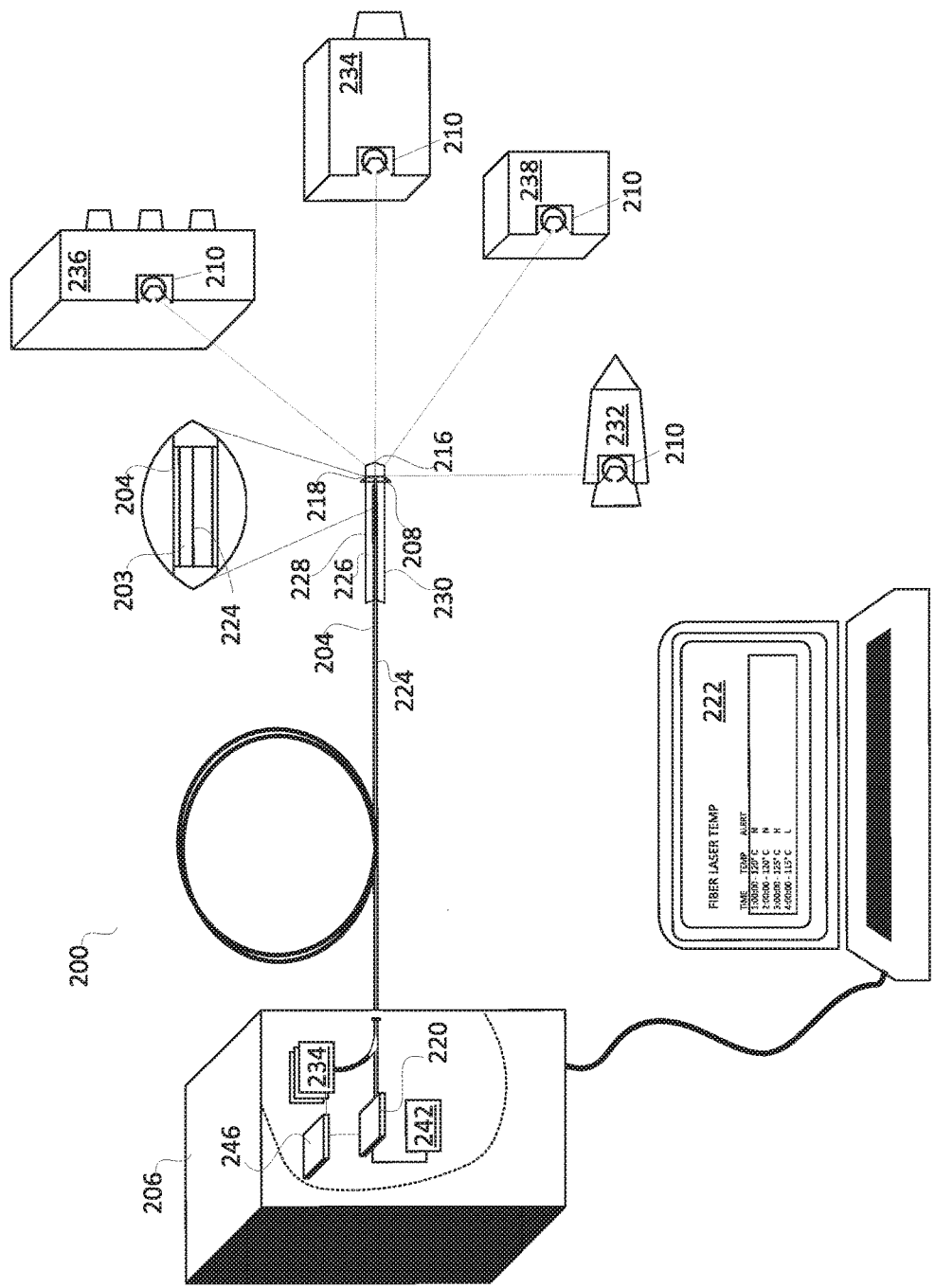
Figure 4:
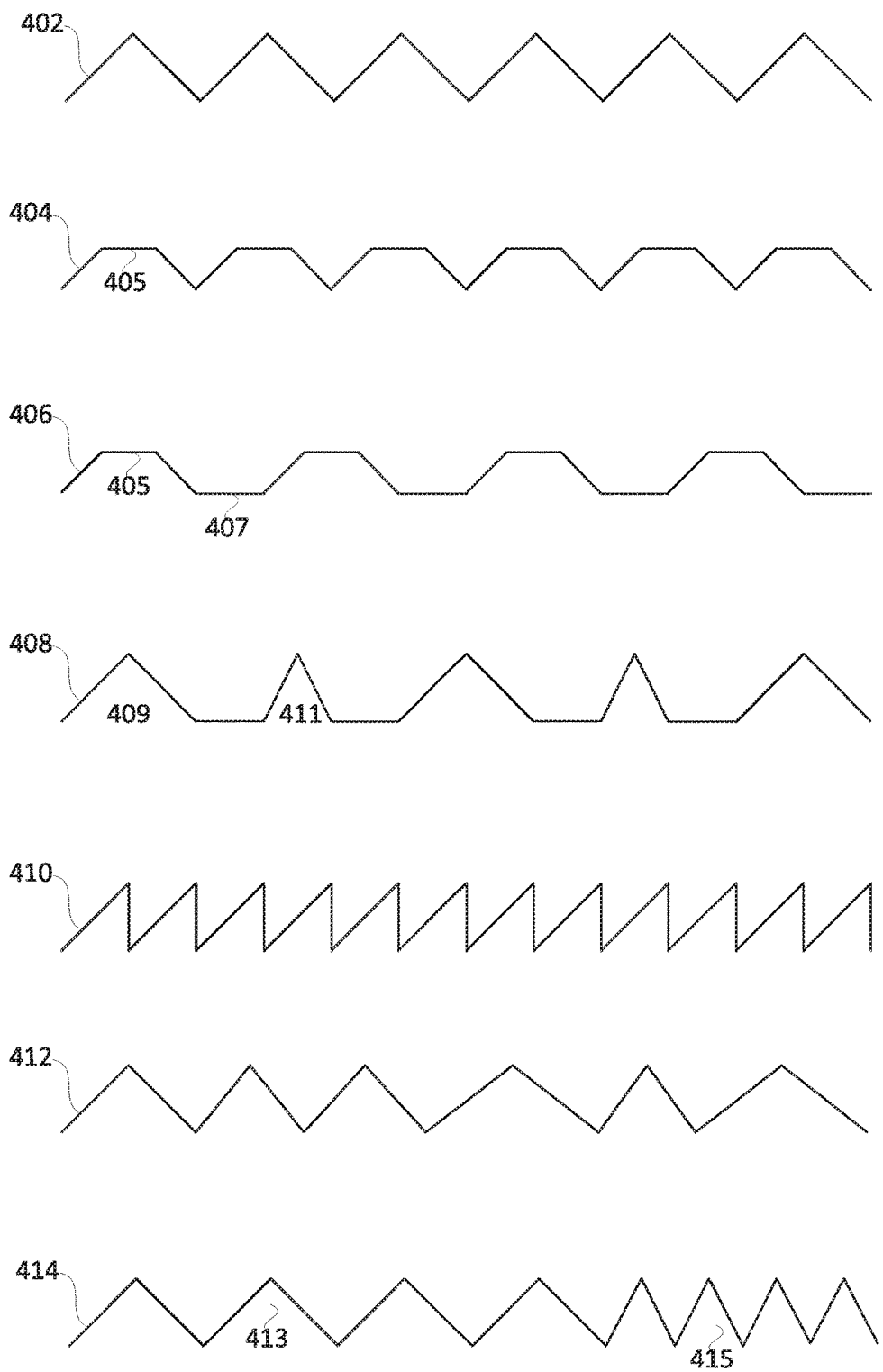
Figure 5:
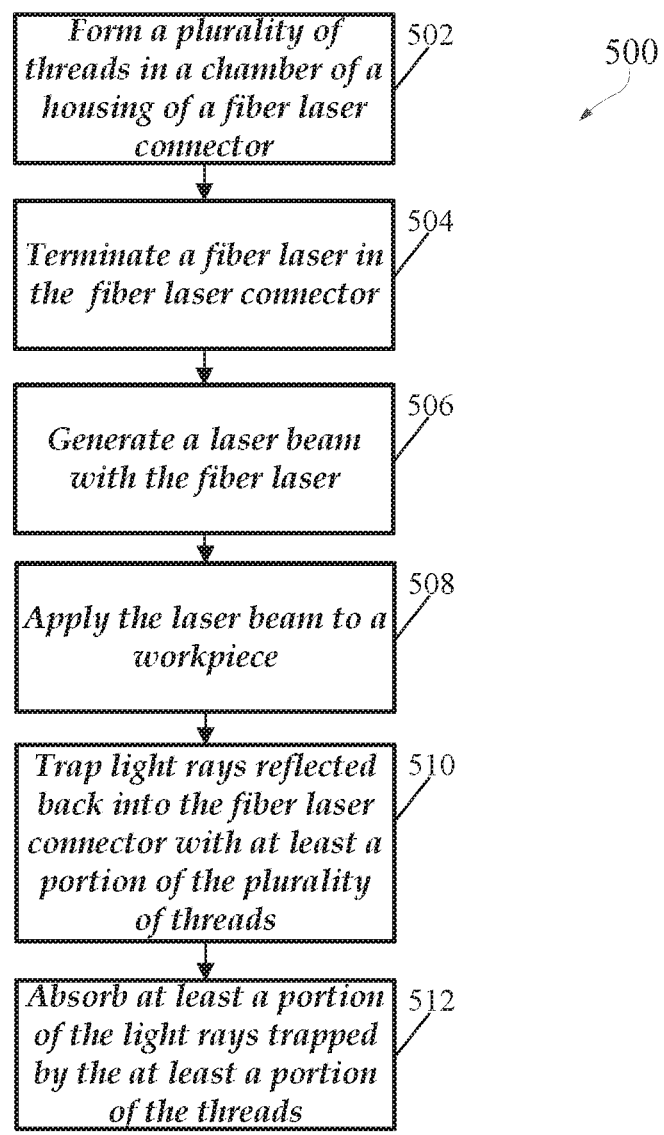

The present disclosure describes various embodiments that may be understood and fully appreciated in conjunction with the following drawings:

FIG. 1A diagrams an embodiment of a cross section of a fiber laser according to the present disclosure;

FIG. 1B diagrams an embodiment of a fiber laser system according to the present disclosure;

FIG. 2 diagrams an embodiment of a fiber laser system according to the present disclosure;

FIGS. 3A-E diagram embodiments of a fiber laser connector in a fiber laser system according to the present disclosure;

FIG. 4 diagrams embodiments of various profiles for threads included in a fiber laser connector according to the present disclosure;

FIG. 5 diagrams an embodiment of a method for operating a fiber laser according to the present disclosure.

DETAILED DESCRIPTION

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure which is not to be limited except by the claims.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest," "best," "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

Fiber lasers may deliver a high power laser beam to effectuate the cutting, marking, welding, sintering, or brazing of various workpieces. In some instances, light reflected back to the fiber laser system as the high power laser beam impinges on the workpiece may cause unconstrained heat, which, in turn, may cause erratic operation or failure of the fiber laser. What is needed is a simple method of dealing with light reflected back to the fiber laser system prior to a failure that is compatible with existing hardware and circuitry so that impending failures can be detected and avoided.

FIGS. 1A and 1B diagram an embodiment of a cross section of a fiber laser 100 according to the present disclosure. Referring to FIGS. 1A and 1B, fiber laser 100 may include a core 102 surrounded by a cladding 104 and a protective coating 106. Core 102 may have a different refractive index than cladding 104. Depending on size, refractive index, and wavelength, core 102 may be single mode or multi-mode although single mode is preferred for many applications. Core 102 may be made of a variety of materials including well-known silica-based materials. Core 102 may include a dopant 103 from the lanthanide series of chemicals including Erbium or Ytterbium that release light energy at useful wavelengths. Fiber laser 100 may be illuminated by a light source 110, e.g., a laser diode. Light source 110 may be a single diode, an array of diodes, or many separate pump diodes, each with a fiber going into a coupler. Fiber laser 100 may further include a grating 114 at both ends of coil 111 to manipulate or otherwise filter light source 110 and deliver it as a laser beam 116. Fiber laser 100 may be used in a variety of applications including welding heavy sheets of metal, cutting high-strength steel used to produce automobiles, cutting and drilling concrete, and microscale and nanoscale machining or etching.

In some applications, fiber laser 100 may have a length between several millimeters and hundreds of meters, most commonly in the 1-30 meter range. Fiber laser 100 may be coiled 111 with a generally permissible bend radius in the 100-200 millimeters. Fiber laser 100 may release heat during operation that requires efficient heat removal to avoid damaging core 102, cladding 104, or associated control and other circuitry.

FIG. 2 diagrams an embodiment of a fiber laser system 200 according to the present disclosure. Referring to FIG. 2, fiber laser system 200 includes a light trap 203 for effectively processing reflected light to avoid failures. Fiber laser system 200 includes a laser module 206 for generating a laser beam 216 to be transmitted via fiber 224 to fiber connector or coupler 228. Fiber conduit or cladding 204 may encase fiber 224 as is well known to a person of ordinary skill in the art.

In an embodiment, laser module 206 may include a processor 220 and one or more laser diodes 234 coupled to fiber 224 to pump an optical beam 216 along fiber 224. Processor 220 may be coupled to laser diode controller 246 configured to control one or more laser diodes 234. Laser diodes 234 may be of any type known to a person of ordinary skill in the art. Laser diodes 234 may be any number and arranged in any configuration known to a person of ordinary skill in the art.

Fiber connector 228 is configured to couple fiber 224 to any of many different types of lasing devices such as a process head 232, a fiber-to-fiber coupler 234, fiber-to-fiber switch 236, test station 238, or the like, or any combination thereof. Fiber connector 228 may include a housing 230, chamber 226, an endcap 218, a connecting portion 208, and a light trap 203. Housing 230 may encase at least a portion of light trap 203 and fiber 224. Housing 230 may be made of any material known to a person of ordinary skill in the art, e.g., metals such as copper. Housing 230 may include a chamber 226 that may extend at least a portion of a length of fiber connector 228 and enclose fiber 224, connecting portion 208, endcap 218, and light trap 203.

Endcap 218 may be formed at a distal end of fiber 224 to terminate fiber 224. Endcap 218 may be made of any material known to a person of ordinary skill in the art. A connecting portion 208 of fiber connector 228 may mate in any manner known to a person of ordinary skill in the art with a receptacle 210 that, in turn, may electrically couple the lasing device to control and other circuits in fiber connector 228. Receptacle 210 may be disposed in any of a variety of lasing devices compatible with fiber connector 228, such as, for example, process head 232, fiber-to-fiber coupler 234, fiber-to-fiber switch 236, test station 238 or the like, or any combination thereof. Fiber conduit 204 encasing fiber 224 may be terminated at a back end of fiber connector 228. Fiber conduit 204 may also encase or otherwise enclose control and other circuits (not shown) to operate fiber 224.

Light trap 203 may be formed on chamber 226 to trap light reflected back into the fiber 224 or fiber connector 228 as detailed below. Light trap 203 may prevent damage to fiber 224 or, more broadly, to fiber system 200, by reducing heat dissipated by the reflected light.

A multitude of conditions may arise within fiber connector 228 that may result in mechanical or thermal damage to fiber connector 228, fiber 224, or any control or other circuits within fiber connector 228. Such conditions include: backscattered light reflecting from a workpiece back into the fiber housing 230 or fiber 224, contamination within fiber housing 230 or on the fiber 224, irregularities in fiber 224, problems removing waste heat, mechanical stress on fiber connector 228 or fiber 224, photo-darkening of fiber 224, a variety of other fiber, mechanical, or like failures, or combinations thereof.

In an embodiment, processor 220 may initiate or trigger various actions based on detecting various failure conditions within fiber connector 228 using any of a variety of control and other circuits within fiber connector 228, laser module 206, or graphical user interface (GUI) 222. These failure conditions may include, e.g., a temperature outside of a pre-determined nominal temperature, a temperature within a range of predetermined unacceptable temperatures, a temperature related fault indicator in laser system 200, or the like. Such actions may include disrupting, disabling, or throttling one or more laser diodes 234 or initiating other evasive action to prevent or mitigate damage to any portion of laser system 200 by sending commands to laser diode controller 236 based on temperature or other data derived from readings of control or other circuits within fiber connector 228.

Furthermore, processor 220 may store temperature or other data in memory 242, which may be of any type known to a person of ordinary skill in the art. Processor 220 may operate in connection with a user via GUI 222. Processor 220 may use such stored temperature or other data to identify temperature behavior or other patterns associated with laser damaging fault conditions. Processor 220 may use these identified behavior or patterns to predict and automatically respond to future fault conditions. Processor 220 may identify a pattern of temperature fluctuation or other failure mechanisms associated with an identifiable fault condition (the fault condition may be automatically recognized by the processor 220 or user and associated with the pattern by the processor or manually associated by the user). Subsequently, during operation of the fiber-delivered laser system 200, processor 220 may detect the identified pattern to predict the fault condition. In an example, processor 220 may identify a pattern of temperature fluctuation that precedes an identifiable fault condition and to associate the fault condition with the pattern where identifying the fault condition triggers the association. Again, identifying the fault condition may be automated or done manually by a user using GUI 222. Processor 220 may be further configured to trigger a laser diode 234 shutdown based on detecting the identified pattern to prevent the fault condition from causing a failure in the fiber laser system 200.

Likewise, temperature or other data stored in memory 242 data may be viewed by a user on GUI 222 and used to make administrative decisions such setting different temperature thresholds or manual over-ride conditions, for example.

FIGS. 3A-E diagram embodiments of a fiber laser connector 328 for a fiber laser system 300 according to the present disclosure. FIG. 4 diagrams embodiments of various profiles for threads included in a fiber laser connector according to the present disclosure. Referring to FIGS. 1, 2, 3A-E, and 4, fiber laser system 300 includes a fiber 324 for generating a laser beam 216. Fiber connector 328 is configured to couple fiber 324 to any of many different types of lasing devices, e.g., process head 232, fiber-to-fiber coupler 234, fiber-to-fiber switch 236, test station 238, or the like, or any combination thereof. Fiber 324 may be of any type known to a person of ordinary skill in the art. Fiber 324 may include cladding and other structures as is known to a person of ordinary skill in the art. Fiber 324 may have any power rating appropriate for the intended application as is well known to a person of ordinary skill in the art.

Fiber connector 328 may include a housing 330 and a chamber 326. Housing 330 may encase, enclose, or otherwise house at least a portion of light trap 303 and fiber 324. Housing 330 may be made of any material known to a person of ordinary skill in the art, e.g., metals such as copper. Housing 330 may include a chamber 326 that may extend internally at least a portion of a length of fiber connector 228. Chamber 326 may have a substantially cylindrical cross-section, but other cross-sectional shapes, e.g., square, oval, or the like, known to a person of ordinary skill in the art come within the scope of the disclosure.

Figure 3D:
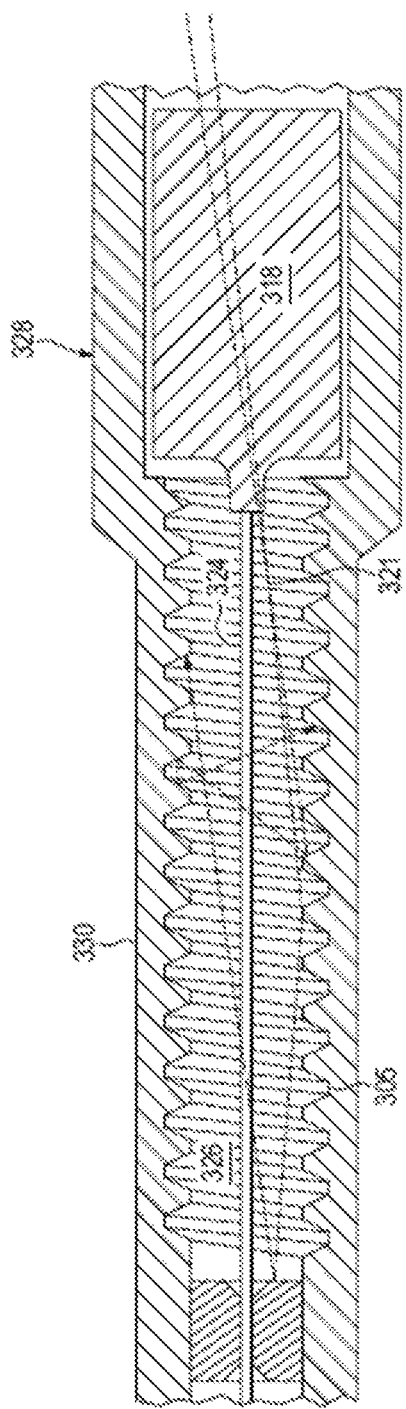

A plurality of internal threads or grooves 305 may be formed along a wall 331 of chamber 326 to reflect light rays 321. The plurality of internal threads 305 may be of any number or have any profile as is known to a person of ordinary skill in the art. In an embodiment, the plurality of threads 305 may be formed on wall 331 as a single continuous helical series of ridges extending from one end of connector 328 to another end of connector 328 as shown in FIG. 3D. In another embodiment, the plurality of threads 305 may be a series of distinct substantially parallel channels or grooves as shown in at least FIGS. 3A, 3B, and 3E. The plurality of threads 305 may have any size known to a person of ordinary skill in the art, including any gauge or threads per inch, e.g., 10-32, 10-24, and so on.

A design tradeoff may exist between a diameter of chamber 326, a length of chamber 326, and effective heat absorption of reflected rays 321. A smaller diameter chamber 326 may cause reflected rays 321 to have more internal reflections and thus, prevent reflected rays 321 from reaching a rear of connector 328. But a smaller diameter chamber 326 would force a larger portion of the heat from reflected rays 321 to be absorbed near the output end of connector 328, where there may be less cooling chambers 333 to cool chamber 326. And the smaller diameter chamber 326 would result in more heat from reflected rays 321 over a smaller surface area, resulting in higher heat over that smaller surface area.

In an embodiment, the plurality of threads 305 may have variously-shaped profiles or contours. In an embodiment, each of the plurality of threads 305 may have a substantially triangular profile, as shown at 402. In another embodiment, each of the plurality of threads 305 may have a substantially triangular profile with flat peaks 405, as shown at 404. In yet another embodiment, each of the plurality of threads 305 may have a substantially triangular profile with flat peaks 405 and flat valleys 407, as shown at 406. Flat peaks 405 or flat valleys 407 may result from production or machining limitations as is well known to a person of ordinary skill in the art. In yet another embodiment, each of the plurality of threads 305 may have a substantially triangular profile with a first triangle type 409 and a second triangle type 411 different from first triangle type 409, as shown at 408. In an embodiment, first triangle type may have three sides of equal length while second triangle type 409 may be two sides of equal length, as shown at 408. In yet another embodiment, each of the plurality of threads 305 may have a substantially sawtooth profile as shown at 410.

In an embodiment, the plurality of threads 305 may have a substantially uniform pitch between adjacent threads 305, as shown at 402, 404, 406, 408, or 410. In another embodiment, the plurality of threads 305 may have a substantially non-uniform pitch between adjacent threads, as shown at 412. In yet another embodiment, the plurality of threads 305 may have a first portion 413 that has a substantially uniform pitch between adjacent threads 305 and a second portion 415 that has a substantially uniform but different pitch between adjacent threads 305, as shown at 414. In yet a further embodiment, only some portion of chamber 326 may have threads 305 while a remaining portion may have a smooth (yet reflective) surface.

Figure 3E:
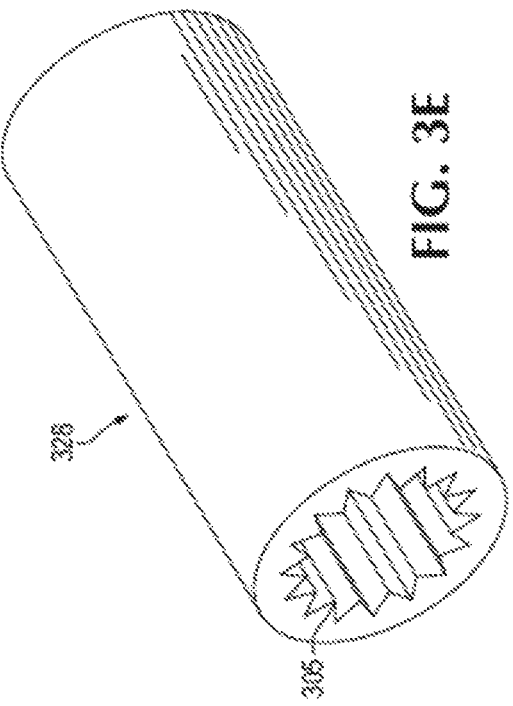

In the embodiment shown in FIG. 3E, the plurality of threads 305 may be splines formed to run substantially horizontally along a length of chamber 326 in fiber laser connector 328. The plurality of threads or splines, in this embodiment, may be made by any means known to a person of ordinary skill in the art, e.g., broaching. The plurality of threads or splines 305 may be rounded at top and bottom points to increase lateral spreading of light.

A reflective plating or coating 309 may improve the optical reflective properties of the plurality of threads 305. Reflective plating or coating 309 may comprise any reflective material in any form known to a person of ordinary skill in the art, particularly those reflective materials having a reflection in the range of 50% to 90%, e.g., metals such as nickel, chromium, platinum, or a combination thereof. Reflective plating or coating 309 may be applied to the plurality of threads 305 in any manner known to a person of ordinary skill in the art, e.g., plating, laminating, deposing, and the like. Reflective coating or plating 309 may be resistant to tarnishing so the reflectivity stays constant over the life of fiber laser system 300.

Endcap 318 may be formed at a distal end of fiber 324 to terminate fiber connector 328 (and any passive fiber spliced to fiber 324). Endcap 318 may be made of any material known to a person of ordinary skill in the art, e.g., fused silica.

A connecting portion 308 of fiber connector 328 may mate in any manner known to a person of ordinary skill in the art with a receptacle 210 of a lasing device, e.g., devices 232, 234, 236, or 238. By doing so, fiber connector 328 may electrically couple the lasing devices to control and other circuits in fiber connector 328. Receptacle 210 may be disposed in any of a variety of lasing devices compatible with fiber connector 328, such as, for example, process head 232, fiber-to-fiber coupler 234, fiber-to-fiber switch 236, test station 238 or the like, or any combination thereof.

A plurality of cooling chambers 333 may surround the chamber 326. Each cooling chamber 333 may have cooling fluid (not shown) circulating therein to dissipate heat generated by threads 305 or fiber 324. The cooling fluid (not shown) may be any fluid capable of dissipating heat, e.g., water. In an embodiment, the plurality of cooling chambers 333 may be formed of a double continuous helix water channel extending from one end of connector 328 to an opposite end of connector 328 to maximize the surface area for heat exchange between the threads 305 and the chambers 333, as disclosed in U.S. patent application Ser. No. 15/594, 494, titled Double Helix Coolant Path for High Power Fiber Connector, filed May 12, 2017, which is incorporated herein by reference in its entirety.

Fiber laser connector 328 includes a light trap 303, in turn, including chamber 326 and housing 330. Light trap 303 may be formed on wall 331 of chamber 326 to trap or re-reflect light rays 321 reflected back into the fiber 324 or fiber connector 328 when a light beam 216 impinges on a workpiece (not shown). Reflected light rays 321 may damage fiber 324 or connector 328 by generating unconstrained heat that, in turn, may generate damaging hot spots that cannot be cooled effectively using, e.g., cooling chambers 333. Hot spots may damage optical, control, or processing devices or structures in fiber connector 328 if not minimized, reduced, or eliminated.

Light trap 303 may prevent damage to fiber 324 or fiber connector 328 by reducing heat dissipated by the reflected rays 321 at any given reflection point or spot. In an embodiment, reflected rays 321 may be reflected a plurality of times, e.g., 4-8 times, to substantially absorb all of the power in the light trap through the use of the plurality of threads 305. The plurality of threads 305 allows the re-reflection of reflected light rays 321 within chamber 326, dissipating heat at each reflection point using, e.g., cooling chambers 333.

Thus, for example, a ray 321a re-reflects at a first reflection point 323a, a second reflection point 323b, and a third reflection point 323c, dissipating heat energy at each reflection point 323a, 323b, and 323c to avoid damaging fiber 324 or fiber connector 328. Note that first and third reflection points 323a and 323c are threads 305 while second reflection point 323b comprise a back end of connector 328, which may include processing and control structures and devices. For another example, a ray 321b reflects off a first reflection point 325a, a second reflection point 325b, a third reflection point 325c, and a fourth reflection point 325d, dissipating heat energy at each reflection point 325a, 325b, 325c, and 325d to avoid damaging fiber 324 or fiber connector 328. In this embodiment, the reflection points 325a, 325b, 325c, and 325d comprise threads 305. Substantially all of the power is absorbed in threads 305, although a small fraction of re-reflected rays 321 may end up being reflected out through end cap 318 and out the fiber connector 328.

The plurality of threads 305 at least partially re-reflect or trap the reflected rays 321 to get multiple reflections before any reflected rays 321 hit the clad light stripping section 335 at an end of connector 328. In an embodiment where the reflective plating or coating 309 is a partial reflector, a portion of heat is absorbed during each reflection point 323a, 323b, 323c, 325a, 325b, 325c, and/or 325d, and most of the heat is absorbed in the range of 4 to 8 reflections.

FIG. 5 diagrams an embodiment of a method 500 for operating a fiber laser according to the present disclosure. Referring to FIG. 5, at 502, method 500 forms a plurality of threads in a chamber of a housing of a fiber laser connector. At 504, method 500 terminates a fiber in the housing of the fiber laser connector. In some embodiments, method 500 may splice a passive (undoped) fiber to an end of the fiber and feed or deliver the passive fiber through the length of the connector to the fiber laser connector's output end as is well known to a person of ordinary skill in the art. At 506, method 500 generates a laser beam with a fiber and, at 508, applies the laser beam to a workpiece via the fiber laser connector. At 510, method 500 traps light rays reflected back into the fiber laser connector with at least a portion of the plurality of threads. At 512, method 500 absorbs a least a portion of the light rays trapped by the at least a portion of the threads on which the reflected light rays impinge to dissipate heat and thereby prevent damage to the fiber laser connector.

Persons of ordinary skill in the art will appreciate that that the present disclosure is not limited to what has been particularly shown and described hereinabove. Rather, the scope of the present disclosure includes both combinations and sub-combinations of the various features described hereinabove as well as modifications and variations which would occur to such skilled persons upon reading the foregoing description. Thus only the appended claims may limit the present disclosure.

The invention claimed is:

1. A system, comprising:
a fiber connector including a housing, the housing including a first section to terminate a fiber to generate a laser beam and a second different section to encase at least a portion of the fiber;
a chamber extending internally along a length of the second section of the housing, wherein a wall of the chamber is optically non-transmissive; and
a light trap including plurality of threads formed along the wall of the chamber to trap light reflected back to the fiber connector in response to an application of the laser beam to a workpiece.

2. The system of claim 1, wherein the chamber has a substantially cylindrical cross-section.

3. The system of claim 1, wherein the plurality of threads are helically shaped around the wall of the chamber.

4. The system of claim 1, wherein the plurality of threads are formed to have a substantially uniform pitch between adjacent ones of the plurality of threads.

5. The system of claim 1, wherein the plurality of threads are formed to have a substantially non-uniform pitch between adjacent ones of the plurality of threads.

6. The system of claim 1, wherein the plurality of threads are formed to have a substantially triangle sawtooth contour.

7. The system of claim 1, further comprising:
a reflective plating or coating formed on the plurality of threads formed along the wall of the chamber.

8. The system of claim 7, wherein the reflective plating or coating comprises a partial reflector.

9. The system of claim 8, wherein the reflective plating or coating comprises nickel, chromium, platinum or a combination thereof.

10. The system of claim 1, wherein the first section of the housing comprises an end cap.

11. A fiber laser assembly to couple to a lasing device, the fiber laser assembly comprising:
a pump source;
a fiber having a first end coupled to the pump source, wherein a portion of the fiber is configured to generate a laser beam from pump light of the pump source;
a fiber connector to receive a second end of the fiber, the fiber connector to mate with a receptacle of the lasing device, the fiber connector including:
a housing including a section to enclose at least a portion of the second end of the fiber;
a chamber extending internally along a length of the section of the housing, wherein a wall of the chamber is optically non-transmissive; and
a plurality of threads formed along the wall of the chamber to trap light reflected back to the fiber connector in response to delivery of the laser beam.

12. The fiber laser assembly of claim 11, wherein the section of the housing comprises a first section of the housing, and wherein the housing includes a second different section, the second section comprising an end cap.

13. The fiber laser assembly of claim 11,
wherein the chamber has a substantially cylindrical cross-section; and
wherein the plurality of threads are helically shaped around the wall of the chamber.

14. The fiber laser assembly of claim 11,
wherein the plurality of threads are formed to have a substantially uniform pitch between adjacent ones of the plurality of threads; and
wherein the plurality of threads are formed to have a substantially triangle sawtooth contour.

15. The fiber laser assembly of claim 11, wherein the plurality of threads are formed to have a substantially non-uniform pitch between adjacent ones of the plurality of threads.

16. The fiber laser assembly of claim 11, further comprising:
a reflective plating or coating formed on the plurality of threads formed along the wall of the chamber; and
wherein the reflective plating or coating comprises nickel, chromium, platinum, or a combination thereof.

17. The fiber laser assembly of claim 16, wherein at least some of the plurality of threads reflect each ray at least twice.

18. The fiber connector of claim 11, further comprising:
a reflective plating or coating formed on the plurality of threads formed along the wall of the chamber; and
wherein the reflective plating or coating comprises reflective materials having a reflection in the range of about 50% to 90%.

19. A method, comprising:
forming a plurality of threads along an optically non-transmissive wall of a chamber in a housing of a fiber laser connector;
generating a laser beam with a fiber laser terminated by the fiber laser connector;
receiving, at the fiber laser connector, light rays reflected back from application of the laser beam to a workpiece; and
trapping each of the light rays multiple times within the chamber using at least some of the plurality of threads.

20. The method of claim 19, further comprising:
at least partially plating the plurality of threads with a reflective coating comprising nickel, chromium, platinum, or a combination thereof.

\* \* \* \* \*